United States Patent
Nappier et al.

(10) Patent No.: US 7,189,033 B2
(45) Date of Patent: Mar. 13, 2007

(54) APPARATUS AND METHODS FOR THRUST SENSING VALVES

(75) Inventors: David N. Nappier, Caseyville, IL (US); David L. Fritsche, Foristell, MO (US); Scott A. Martin, Swansea, IL (US); Kenneth D. Harper, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 271 days.

(21) Appl. No.: 10/717,940

(22) Filed: Nov. 20, 2003

(65) Prior Publication Data

US 2005/0109539 A1 May 26, 2005

(51) Int. Cl.
*B23B 35/00* (2006.01)
*B23B 45/00* (2006.01)

(52) U.S. Cl. .................. 408/1 R; 137/38; 251/321; 408/10; 408/14; 173/4

(58) Field of Classification Search ............... 408/1 R, 408/8, 10, 12, 14, 141, 142; 173/4, 10; 137/38; 251/321
See application file for complete search history.

(56) References Cited

U.S. PATENT DOCUMENTS

| | | | |
|---|---|---|---|
| 3,259,023 A * | 7/1966 | Rieger et al. ............... 409/187 |
| 3,471,662 A * | 10/1969 | Berchtold ............. 200/61.58 R |
| 3,989,405 A * | 11/1976 | Quackenbush ............... 408/11 |
| 4,063,707 A | 12/1977 | Zouzoulas |
| 4,198,180 A * | 4/1980 | Schultz ........................... 408/9 |
| 4,232,909 A | 11/1980 | Farr |
| 4,310,269 A * | 1/1982 | Neu et al. ..................... 408/11 |
| 4,688,970 A * | 8/1987 | Eckman .......................... 408/9 |
| 4,818,444 A | 4/1989 | Hedderick et al. |
| 4,822,215 A * | 4/1989 | Alexander ..................... 408/9 |
| 4,854,786 A * | 8/1989 | Alexander et al. .......... 408/1 R |
| 4,898,362 A | 2/1990 | Leon |
| 5,022,798 A * | 6/1991 | Eckman ..................... 408/1 R |
| 5,116,168 A * | 5/1992 | Aihara ....................... 408/1 R |
| 5,152,641 A * | 10/1992 | Overmyer et al. .......... 408/1 R |
| 5,257,535 A | 11/1993 | Evans |
| 5,430,368 A | 7/1995 | Leon |
| 5,432,436 A | 7/1995 | Leon et al. |
| 5,538,036 A | 7/1996 | Bergamini et al. |
| 5,739,607 A * | 4/1998 | Wood, III .................. 310/90.5 |

* cited by examiner

*Primary Examiner*—Daniel W. Howell
(74) *Attorney, Agent, or Firm*—Lee & Hayes, PLLC

(57) ABSTRACT

Apparatus and methods for thrust sensing valves are disclosed. In one embodiment, an apparatus includes a housing including an input port and an output port and further having a mounting portion adapted to be coupled to a manufacturing tool. A supply member is operatively coupled to the housing to provide a flow of the pressurized medium into the input port of the housing. Finally, an elongated body is operatively coupled to the housing and moveable along an axis between a first position corresponding to a first pressure output from the housing and a second position corresponding to a second pressure output from the housing. The elongated body is biased into the first position and moveable into the second position in the presence of a thrust force on the mounting portion.

35 Claims, 6 Drawing Sheets

APPARATUS AND METHODS FOR THRUST SENSING VALVES

FIELD OF THE INVENTION

The present disclosure relates to apparatus and methods for thrust-sensing valves, and more specifically, to valves that automatically retract a drilling device when thrust goes to zero.

BACKGROUND OF THE INVENTION

Typically, the stroke of power feed drilling equipment is adjusted for the maximum material thickness in the area drilled. This results in excessive cycle time drilling holes through the thinner materials in that area. In addition, to accommodate material thicknesses that vary to a greater degree, production frequently has to set-up multiple pieces of power feed drilling equipment that are identical except for stroke adjustment. This situation results in the need for additional power feed drill motors and additional time to set-up and control those drill motors. Thus, a need exists to reduce the waste and inefficiency associated with such fixed-stroke drilling apparatus.

SUMMARY OF THE INVENTION

The present invention is directed to apparatus and methods for thrust-sensing valves, and more specifically, to valves that automatically retract a drilling device when thrust goes to zero. Apparatus and methods in accordance with the present invention may advantageously sense when a hole has been completely drilled through a workpiece, and automatically retract to a starting position. In this way, drill cycle times for areas with varying material thicknesses may be optimized. Also, the need to adjust and document the stroke for power feed drilling equipment will be eliminated, as well as the need for multiple drill motor set-ups for areas with a wide range of material thicknesses.

In one embodiment, a thrust sensing valve assembly includes a housing including an input port and an output port and further having a mounting portion adapted to be coupled to a manufacturing tool. A supply member is operatively coupled to the housing to provide a flow of a pressurized medium into the input port of the housing. Finally, an elongated body is operatively coupled to the housing and moveable along an axis between a first position corresponding to a first pressure output from the housing and a second position corresponding to a second pressure output from the housing. The elongated body is biased into the first position and moveable into the second position in the presence of a thrust force on the mounting portion.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to apparatus and methods for thrust-sensing valves, and more specifically, to valves that automatically retract a drilling device when thrust goes to zero. Many specific details of certain embodiments of the invention are set forth in the following description and in FIGS. 1–9 to provide a thorough understanding of such embodiments. One skilled in the art, however, will understand that the present invention may have additional embodiments, or that the present invention may be practiced without several of the details described in the following description.

Figure 1:
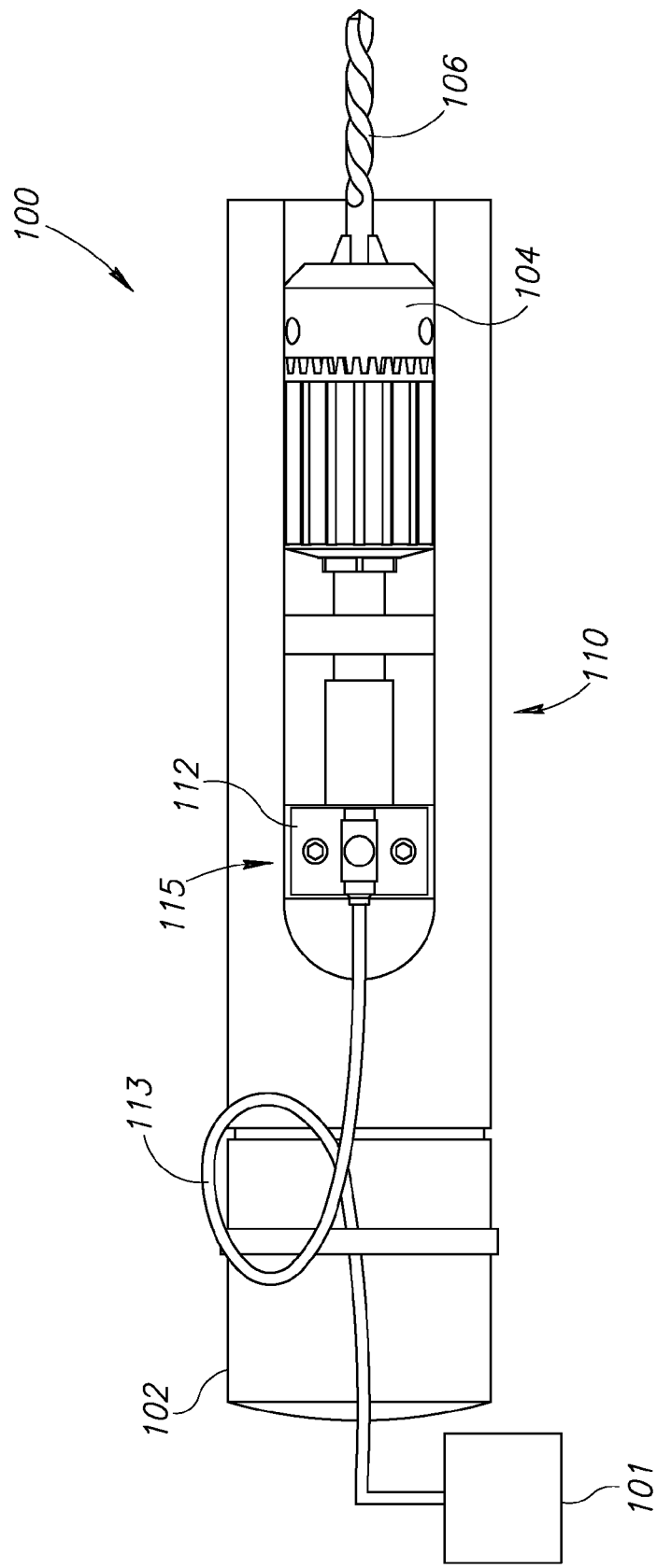
FIG. 1 is side elevational view of a drill assembly having a thrust-sensing valve in accordance with an embodiment of the present invention.

FIG. 1 is side elevational view of a drill assembly 100 having a thrust-sensing valve 110 (partially shown) in accordance with an embodiment of the present invention. In this embodiment, the drill assembly 100 also includes a drive motor 102 coupled to a drill chuck 104. A drill bit 106 is coupled to the drill chuck 104. As described more fully below, the drilling assembly 110 equipped with the thrust-sensing valve 100 may advantageously sense when a hole has been completely drilled through a workpiece, and will automatically retract the drill bit to its starting position.

Figure 2:
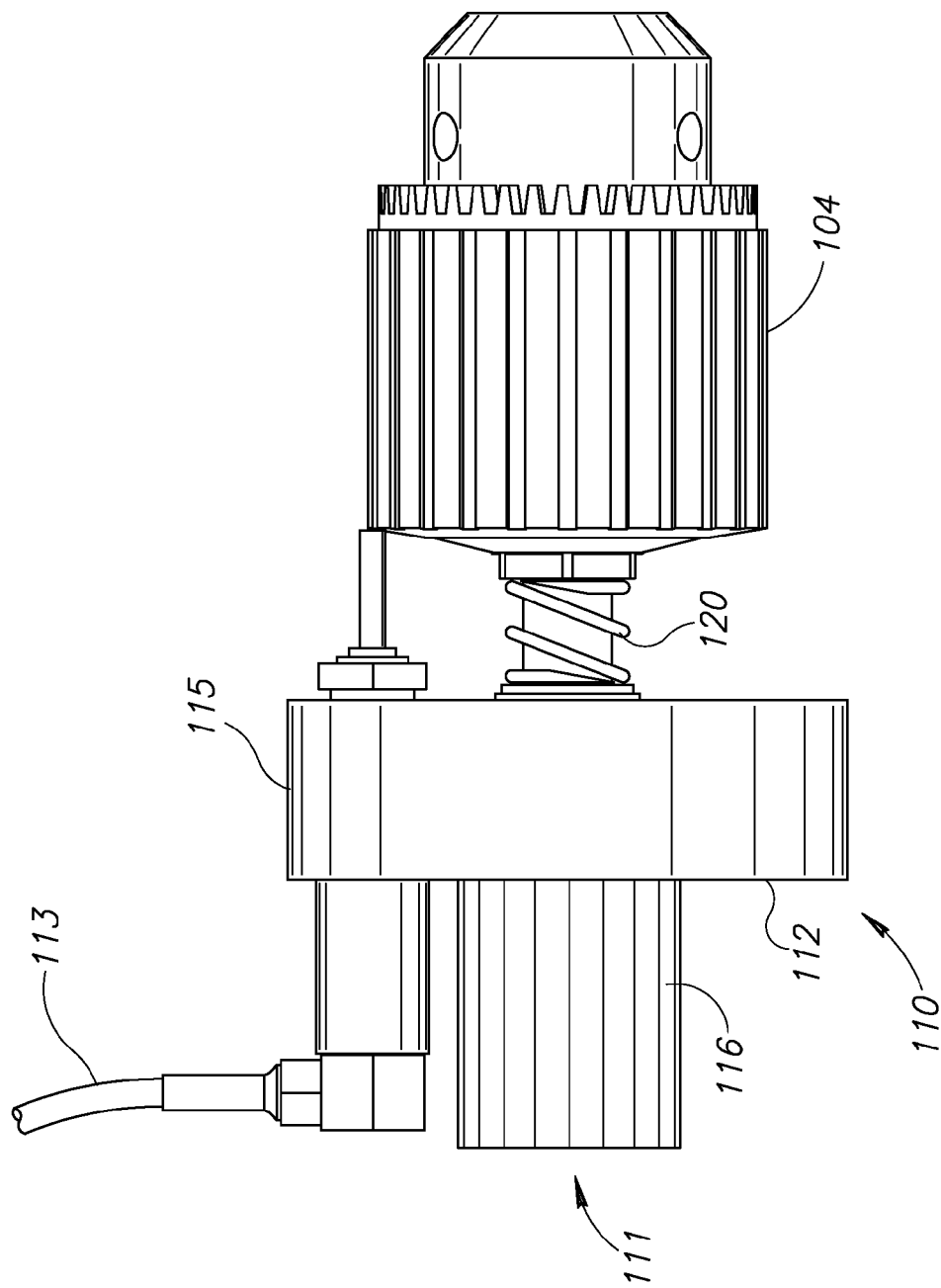
FIG. 2 is an enlarged side elevational view of a thrust valve assembly coupled to a drill chuck of the drill assembly of FIG. 1 in accordance with another embodiment of the invention.
Figure 3:
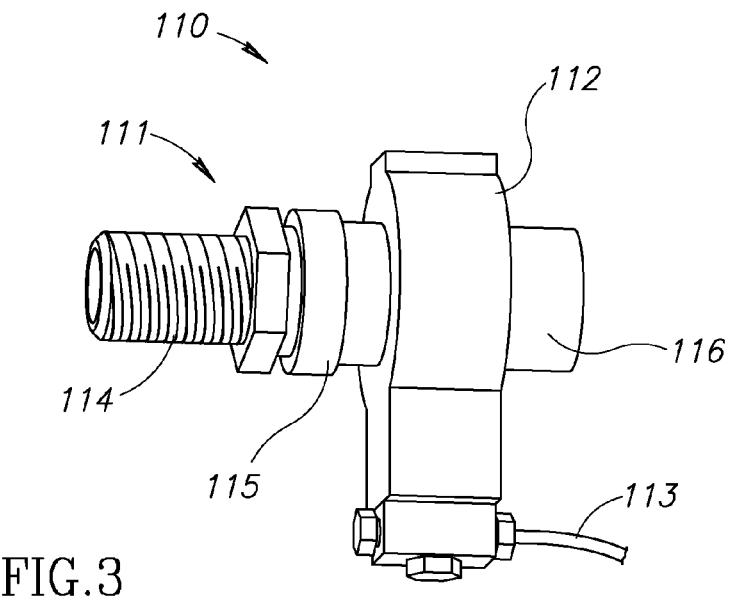
FIG. 3 is an isometric view of the thrust valve assembly of the drill assembly of FIG. 1 in accordance with yet another embodiment of the invention.

FIG. 2 is an enlarged side elevational view of the thrust valve assembly 110 coupled to the drill chuck 104 of FIG. 1. FIG. 3 is an isometric view of the thrust valve assembly 110 of FIG. 2. The thrust valve assembly 110 includes a needle valve 111 operatively coupled to a supply gland 112, and a threaded end 114 that threadedly couples to the drill chuck 104 (FIG. 2). The supply gland 112 is coupled to a supply line 113 that is, in turn, coupled to a source of a pressurized medium 101 (FIG. 1), such as and air pump, a pressurized vessel, shop air, or any other suitable source.

Figure 4:
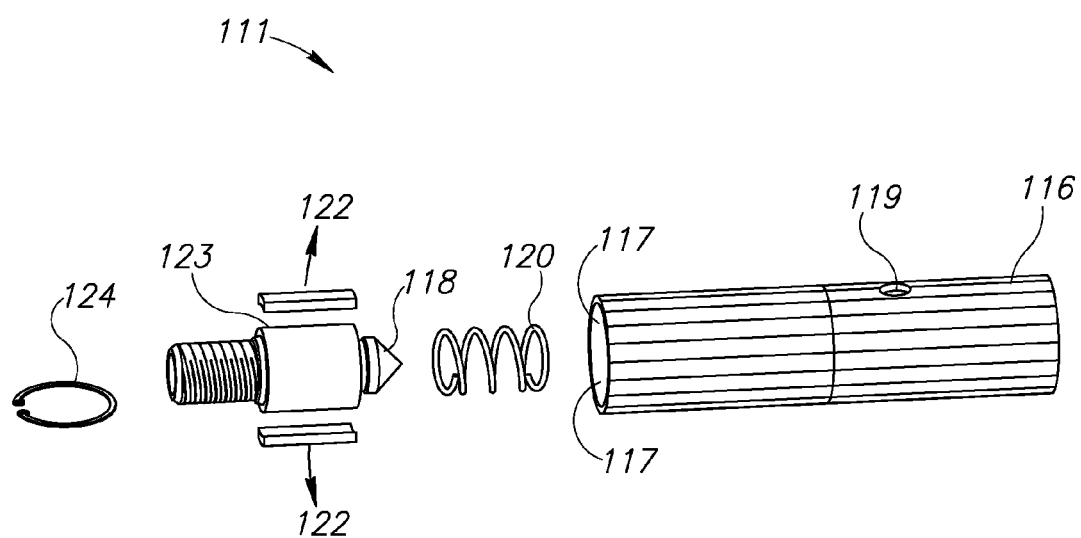
FIG. 4 is an exploded side elevational view of the thrust valve assembly of FIG. 3.
Figure 5:
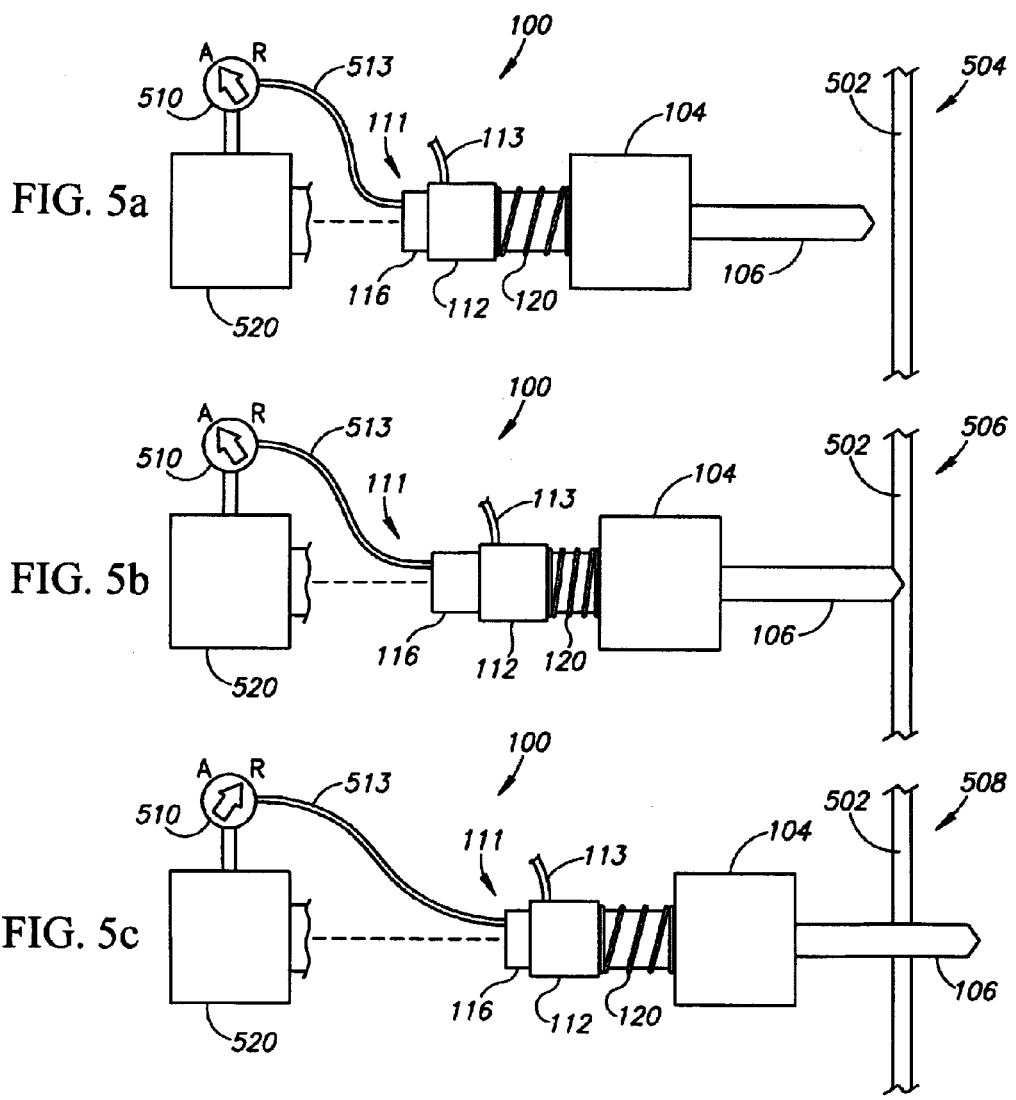
FIGS. 5a, 5b, and 5c are side elevational views of the drilling assembly of FIG. 1 performing various stages of a drilling operation on a workpiece in accordance with an embodiment of the invention.

FIG. 4 is an exploded side elevational view of the needle valve 111 of the thrust valve assembly 110 of FIG. 3. In this embodiment, the needle valve 111 includes an outer valve housing 116 and an inner needle body 118 that, in an assembled position, is slideably disposed within the outer valve housing 116. A spring 120 is disposed about the inner needle body 118. As further shown in FIG. 4, a pair of pins 122 are longitudinally disposed in longitudinal keyways 123 disposed in the inner needle body 118 and corresponding longitudinal keyways 117 disposed in the outer valve housing 116. An aperture 119 is also disposed through the outer valve housing 116. A snap ring 124 secures the components of the thrust valve assembly 110 together.

Operationally, drilling torque is transmitted through the sliding, spring-loaded thrust valve assembly 110 by equipping the outer valve housing 116 and the inner needle body 118 with the longitudinal keyways 123, 117. As the outer valve housing 116 and the inner needle body 118 are assembled, the pins 122 are inserted into the keyways 123, 117. During a drilling operation, torque is transmitted from the outer valve housing 116 through the pins 122 to the inner needle body 118 without interfering with the movement necessary for the thrust valve assembly 110 to operate.

It will also be appreciated that a pressurized medium (e.g. air or other suitable pressurized medium) is supplied to the needle valve 111 via the supply gland 112. The supply gland 112 is equipped with O-ring seals (not visible) that engage between an inner surface of the supply gland 112 and an outer surface of the outer valve housing 116 to minimize pressure losses. In one embodiment, snap rings may be used to maintain the position of the supply gland 112 on the outer valve housing 116. As best shown in FIG. 3, the supply gland 112 includes an anti-rotation lug 115 that projects outwardly and fits through an opening 103 of a drill motor nosepiece 105, as shown in FIG. 1, providing a location for coupling the supply gland 112 with the supply line 113.

FIGS. 5a, 5b, and 5c are side elevational views of the drilling assembly of FIG. 1 performing various stages of a drilling operation on a workpiece 502 in accordance with an embodiment of the invention. In this embodiment, a feedback line 513 is coupled between the needle valve assembly 111 and a control valve 510 of a drive unit 520 of the drill assembly 100.

In FIG. 5a, the drilling assembly 100 is shown in a first (or initial) position 504 prior to engagement with the workpiece 502. The needle valve assembly 111 is biased by the spring 120 into an open position such that a pressurized medium from the supply line 113 enters the supply gland 112, flows through the aperture 119 and through the feedback line 513 to the control valve 510. The control valve 510 is in an advance position A such that the drive unit 520 advances the drill bit 106 toward the workpiece 502.

As shown in FIG. 5b in a second (or engaged) position 506, the drill bit 106 is engaged with the workpiece 502. The needle valve assembly 111 senses the thrust of the drill assembly 100 against the workpiece 502, and the spring 120 compresses, moving the inner needle body 118 into a forward position such that the aperture 119 is blocked, thereby dropping the pressure within the feedback line 513 The control valve 510 senses the pressure drop within the feedback line 513 and remains in the advance position A, maintaining the drive unit 520 in the advance mode of operation and performing a drilling operation on the workpiece 502.

Finally, as shown in FIG. 5c, in a third (or breakthrough) position 508, the drill bit 106 has broken through the workpiece 502, removing the thrust (or compression) force on the needle valve assembly 111 and allowing the spring 120 to re-expand, withdrawing the inner needle body 118 back from the aperture 119 and returning the needle valve assembly 111 to the open position.

It will be appreciated that a variety of embodiments of control valves 510 and drive units 520 may be conceived, and that the invention is not limited to the particular embodiment described above and shown in FIGS. 5a, 5b, and 5c. For example, in one particular embodiment, the control valve 510 may be a 4-way pneumatic valve used in conjunction with the thrust sensing valve 110 to operate an internal spool valve that controls a drill and retract cycle of a power feed drill motor, such as the PAR-A-MATIC® series of pneumatic self-feed drill motors commercially available from Ingersoll-Rand Fluid Products of Bryan, Ohio. In this embodiment, the spool valve shifts to the feed and retract positions as air is exhausted on each side of the valve. Exhaust ports of the spool valve may be coupled to the 4-way control valve such that when the 4-way control valve is manually shifted to an advance, position A by an operator, air (or other pressurized medium) is exhausted from a "feed" side of the spool valve and the drill motor advances. At this time, a metered air supply is being sent to the thrust sensing valve 110. The thrust sensing valve 110 air supply line 113 may also be connected to an air pilot on the 4-way valve so that when the drill starts to penetrate the material closing the thrust sensing valve 110, a back pressure is built up causing the 4-way valve to shift back to its original position B. In position B, the "retract" side of the spool valve is connected to the thrust sensing valve 110. When the drill bit (or other tool) 106 exits the back side of the workpiece, opening the thrust sensing valve 110, the air is exhausted from the "retract" side of the spool valve causing the drill motor to retract.

Figure 6:
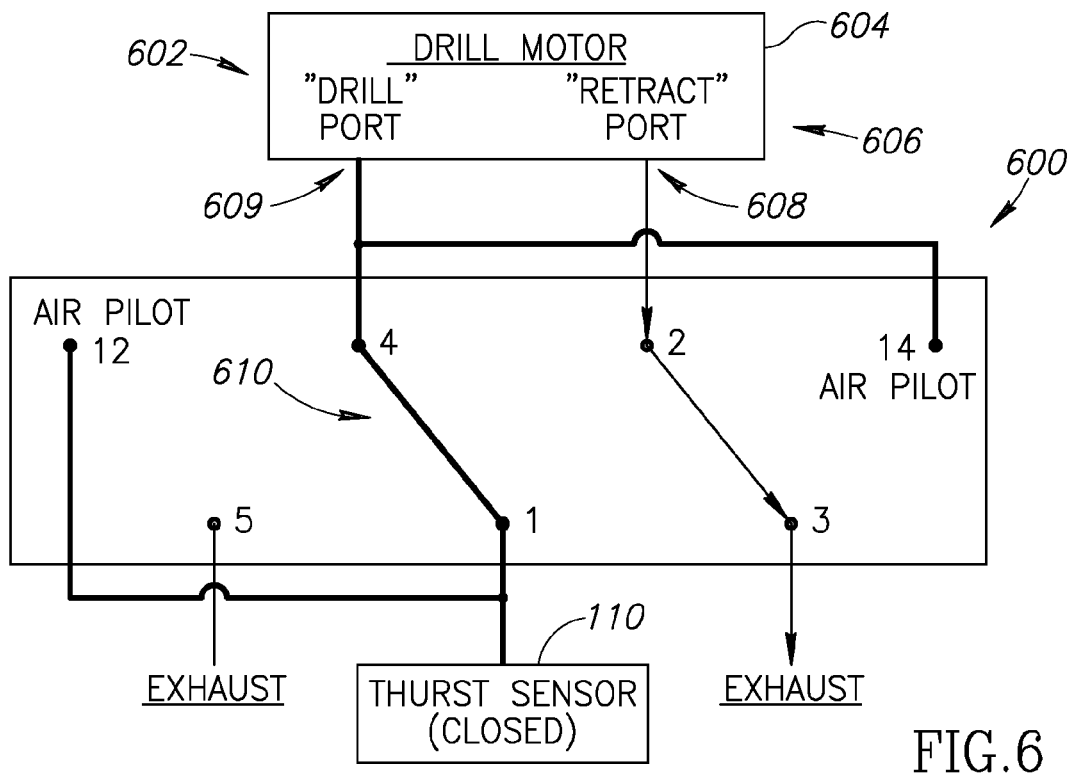
FIG. 6 is a schematic view of a 4-way valve assembly of a drilling assembly in a first operating condition in accordance with yet another embodiment of the invention.

More specifically, FIG. 6 is a schematic view of a 4-way valve assembly 600 of a drilling assembly 602 in a first operating condition 610 in accordance with yet another embodiment of the invention. The drill motor 604 of the drilling assembly 602 is in an initial starting position 606 with the drill bit 106 fully retracted away from the workpiece 502 (FIG. 5a). In this initial starting position 606, the drill motor 604 is in a "retract" position or mode as air exhausts out of a retract port 608. As shown in FIG. 6, the thrust valve assembly 110 (FIGS. 2 and 3) is operatively coupled to the 4-way valve assembly 600 and is initially in a closed position.

Figure 7:
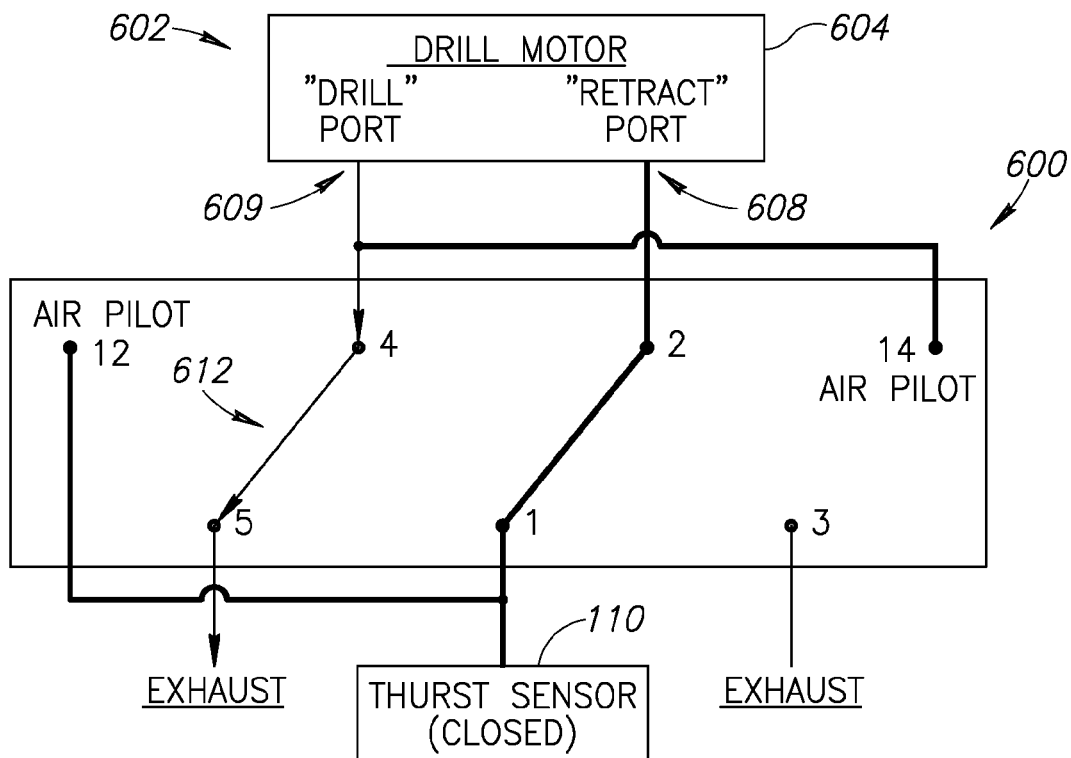
FIG. 7 is a schematic view of the 4-way valve assembly of FIG. 6 in a second operating condition in accordance with an embodiment of the invention.

Next, FIG. 7 shows the 4-way valve assembly 600 of FIG. 6 in a second operating condition 612 after an operator or controller (not shown) has commanded the drill motor 604 to begin drilling. The 4-way valve assembly 600 has now shifted to the second operating condition 612, with the drill motor 604 in the advance or drill position as air exhausts out of a drill port 609 of the drill motor 604. In the second operating condition 612 shown in FIG. 7, the drill bit 106 has not yet contacted the workpiece 502 (FIG. 5a), and the thrust valve assembly 110 remains in the closed position.

Figure 8:
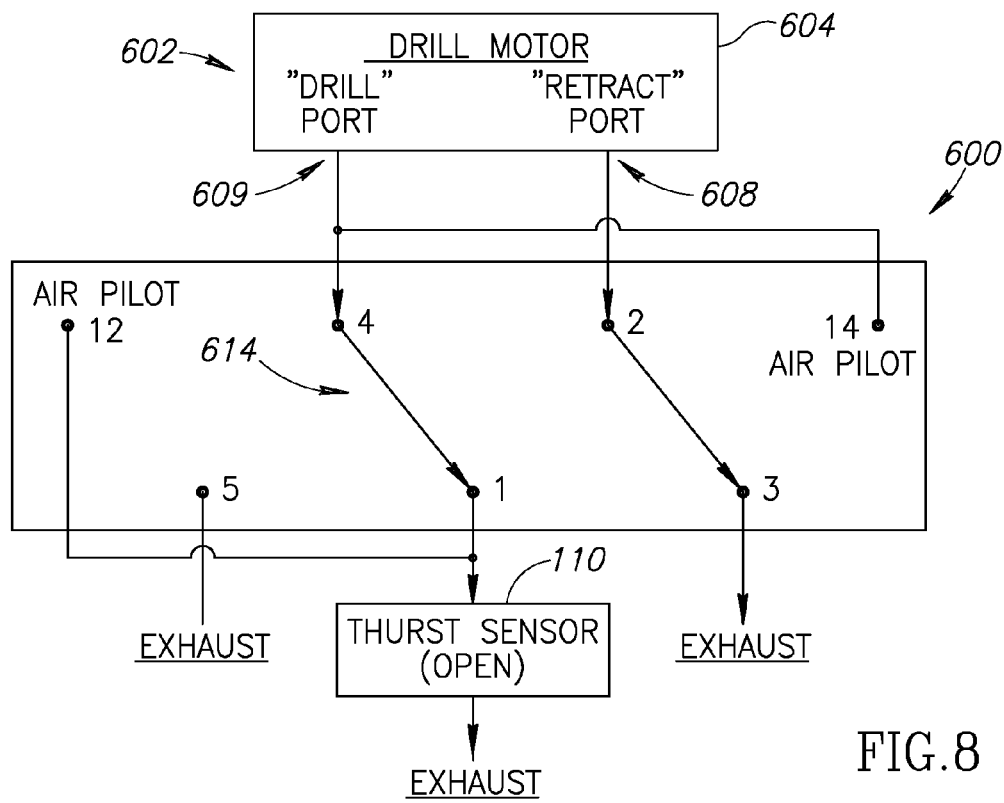
FIG. 8 is a schematic view of the 4-way valve assembly of FIG. 6 in a third operating condition in accordance with an embodiment of the invention.

FIG. 8 shows the 4-way valve assembly 600 of FIG. 6 in a third operating condition 614. As the drill bit 106 contacts the workpiece 502 (FIGURE 5b), the thrust valve assembly 110 moves to an open position. Air pressure at a second air pilot 14 is now greater than an air pressure at a first air pilot 12, causing the 4-way valve assembly 600 to shift to the third operating condition 614. As shown in FIG. 8, in the third operating condition 614, air exhausts out of both the drill and the retract ports 609, 608 of the drill motor 604. The drill motor 604 remains in the drill or advance position, and continues to advance the drill bit 106 into the workpiece 502 (FIG. 5b).

Figure 9:
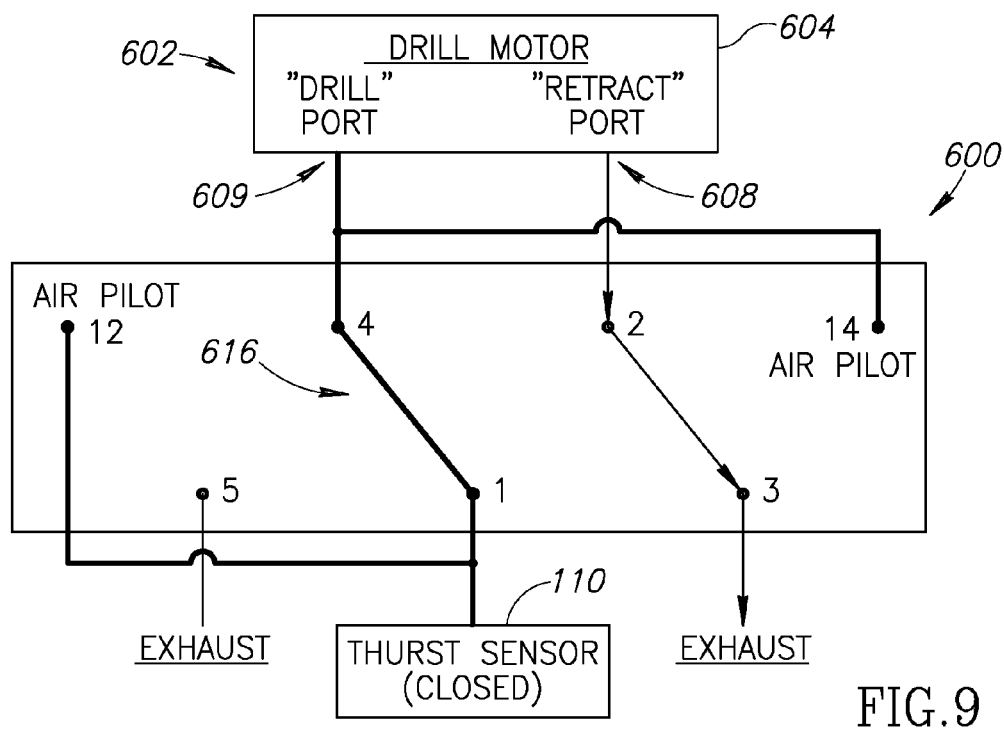
FIG. 9 is a schematic view of the 4-way valve assembly of FIG. 6 in a fourth operating condition in accordance with an embodiment of the invention.

Finally, FIG. 9 shows the 4-way valve assembly 600 in a fourth operating condition 616. In the fourth operating condition 616, the drill bit 106 has broken through the back side of the workpiece 502 (FIG. 5c). The thrust valve assembly 110 returns to the closed position, and air exhausts out of the retract port 608 of the drill motor 604 only. The drill motor 604 then returns to the initial retract position, automatically withdrawing the drill bit 106 back away from the workpiece 502 (FIG. 5a). The drill assembly 602 may then be re-positioned over another location of the workpiece 502, and the operation repeated.

Apparatus and methods in accordance with the present invention may provide significant advantages over the prior art. As described above, manufacturing assemblies equipped with the thrust-sensing valve may advantageously sense when a hole has been completely drilled through a workpiece, and will automatically retract to a starting position. In this way, drill cycle times for areas with varying material thicknesses may be optimized. Also, the need to adjust and document the stroke for power feed drilling equipment will be eliminated, as well as the need for multiple drill motor set-ups for areas with a wide range of material thicknesses.

While various preferred and alternate embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A thrust sensing valve assembly, comprising:
a housing including an input port and an output port and further having a mounting portion adapted to be coupled to a manufacturing tool;
a supply member adapted to be coupled to a source of a pressurized medium and operatively coupled to the housing to provide a flow of the pressurized medium into the input port of the housing; and
an elongated body operatively coupled to the housing and moveable along an axis between a first position corresponding to a first pressure output from the housing and a second position corresponding to a second pressure output from the housing, the elongated body being biased into the first position, and being moveable into the second position in the presence of a thrust force on the mounting portion, wherein the supply member includes a supply gland concentrically disposed about at least a portion of the housing, the housing being further adapted to translate along a longitudinal axis through the supply gland.

2. The assembly of claim 1, wherein the elongated body includes at least one first keyway disposed therein and the housing includes at least one corresponding second keyway disposed therein, the elongated body being operatively coupled to the housing by at least one pin extending between the first and second keyways.

3. The assembly of claim 2, wherein the at least one first and second keyways include a pair of concentrically-spaced keyways positioned on opposing sides of the elongated body.

4. The assembly of claim 1, wherein the supply member includes a supply gland at least partially disposed about the housing.

5. A method of performing a drilling operation on a workpiece, comprising:
providing a thrust sensing valve operatively coupled to a drill member;
while advancing the drill member toward the workpiece, sensing a first thrust condition using the thrust sensing valve;
while continuing to advance the drill member into engagement with the workpiece, sensing a second thrust condition using the thrust sensing valve;
while advancing the drill member into engagement with the workpiece, sensing a return from the second thrust condition at least partially to the first thrust condition; and
retracting the drill member away from the workpiece based on the sensing of the return from the second thrust condition at least partially to the first thrust condition.

6. The assembly of claim 1, wherein the housing is adapted to rotate within the supply gland.

7. The method of claim 5, wherein providing a thrust sensing valve operatively coupled to a drill member includes providing a thrust sensing valve operatively coupled to a control valve assembly of a drive motor, the drive motor being adapted to advance and retract the drill member.

8. The assembly of claim 1, wherein the supply member includes a projection extending outwardly therefrom, the projection being adapted to be coupled to a source of a pressurized medium.

9. The assembly of claim 1, further comprising a spring operatively disposed about a portion of the housing and biasing the elongated body into the first position.

10. A drill assembly, comprising:
a drive assembly operatively coupled to a drill member and adapted to rotate the drill member about a longitudinal axis, and to advance and retract the drill member along the longitudinal axis;
a thrust sensing valve assembly operatively coupled to the drive assembly and to the drill member, the thrust sensing valve assembly including:
a housing including an input port and an output port and further having a mounting portion operatively coupled to the drill member;
a supply member adapted to be coupled to a source of a pressurized medium and operatively coupled to the housing to provide a flow of the pressurized medium into the input port of the housing; and
an elongated body operatively coupled to the housing and moveable along an axis between a first position corresponding to a first pressure output from the housing and a second position corresponding to a second pressure output from the housing, the elongated body being biased into the first position, and being moveable into the second position in the presence of a thrust force on the mounting portion; and
wherein the drive assembly includes a control valve operatively coupled to the thrust sensing valve and being adapted to advance the drill member upon an initial occurrence of the first pressure output, and to continue to advance the drill member upon an occurrence of the second pressure output, and to retract the drill member upon a second occurrence of the first pressure output.

11. The drill assembly of claim 10, further comprising a source of pressurized medium operatively coupled to the supply member.

12. The method of claim 7, wherein while advancing the drill member toward the workpiece, sensing a first thrust condition using the thrust sensing valve includes operating the control valve assembly in a first operating condition when the thrust sensing valve is in a closed position to route a drive medium through an advance exhaust port of the drive motor to advance the drill member toward the workpiece.

13. The drill assembly of claim 10, wherein the control valve includes a 4-way pneumatic control valve.

14. The drill assembly of claim 10, wherein the elongated body includes at least one first keyway disposed therein and the housing includes at least one corresponding second keyway disposed therein, the elongated body being operatively coupled to the housing by at least one pin extending between the first and second keyways.

15. The drill assembly of claim 14, wherein the at least one first and second keyways include a pair of concentrically-spaced keyways positioned on opposing sides of the elongated body.

16. The drill assembly of claim 10, wherein the supply member includes a supply gland at least partially disposed about the housing.

17. The drill assembly of claim 10, wherein the supply member includes a supply gland concentrically disposed about at least a portion of the housing.

18. The drill assembly of claim 17, wherein the housing is adapted to rotate within the supply gland.

19. The drill assembly of claim 17, wherein the housing has a longitudinal axis and is adapted to rotate about the longitudinal axis and translate along the longitudinal axis within the supply gland.

20. The drill assembly of claim 10, wherein the supply member includes a projection extending outwardly therefrom, the projection being adapted to be coupled to a source of a pressurized medium.

21. The drill assembly of claim 10, wherein the drive assembly includes:
   a drive motor having retract exhaust port and a drill exhaust port; and
   a control valve assembly operatively coupled to the drive motor and to the thrust sensing valve assembly,
   wherein the control valve assembly is adapted to operate in a first operating condition when the thrust sensing valve assembly is in a closed position to route a drive medium through the retract exhaust port of the drive motor to retract the drill member along the longitudinal axis away from a workpiece,
   the control valve assembly being further adapted to operate in a second operating condition when the thrust sensing valve assembly is in the closed position to route the drive medium through a drill exhaust port of the drive motor to advance the drill member along the longitudinal axis toward the workpiece,
   the control valve assembly being further adapted to operate in a third operating condition when the thrust sensing valve assembly is in an open position to route the drive medium through both the drill exhaust port and the retract exhaust port of the drive motor to continue to advance the drill member along the longitudinal axis toward the workpiece, and
   the control valve assembly being further adapted to operate in a fourth operating condition when the thrust sensing valve assembly has returned to the closed position to route the drive medium through the retract exhaust port of the drill motor to retract the drill member along the longitudinal axis away from the workpiece.

22. A method of performing a manufacturing operation on a workpiece, comprising:
   while advancing a manufacturing tool toward the workpiece, sensing a first thrust condition exerted upon the manufacturing tool using a thrust valve assembly;
   while advancing the manufacturing tool into engagement with the workpiece, sensing a second thrust condition exerted upon the manufacturing tool;
   while advancing the manufacturing tool into engagement with the workpiece, sensing a return from the second thrust condition at least partially to the first thrust condition; and
   retracting the manufacturing tool away from the workpiece based on the sensing of the return from the second thrust condition at least partially to the first thrust condition.

23. The method of claim 12, wherein while continuing to advance the drill member into engagement with the workpiece, sensing a second thrust condition using the thrust sensing valve includes operating the control valve assembly in a second operating condition when the thrust sensing valve is in an open position to route the drive medium through both the advance exhaust port and a retract exhaust port of the drive motor to continue to advance the drill member toward the workpiece.

24. The method of claim 22, wherein sensing a first thrust condition exerted upon the manufacturing tool includes sensing a zero thrust condition exerted upon the manufacturing tool.

25. The method of claim 22, wherein sensing a second thrust condition exerted upon the manufacturing tool includes sensing a non-zero thrust condition exerted upon the manufacturing tool.

26. The method of claim 22, wherein while advancing a manufacturing tool toward the workpiece includes while simultaneously rotating and advancing a manufacturing tool toward the workpiece.

27. The method of claim 22, wherein sensing a return from the second thrust condition at least partially to the first thrust condition includes sensing a breakthrough of the manufacturing tool through the workpiece.

28. The method of claim 22, wherein retracting the manufacturing tool includes simultaneously rotating and retracting the manufacturing tool.

29. The method of claim 23, wherein while advancing the drill member into engagement with the workpiece, sensing a return from the second thrust condition at least partially to the first thrust condition includes operating the control valve assembly in a third operating condition when the thrust sensing valve has returned to the closed position to route the drive medium through the retract exhaust port of the drill motor to retract the drill member away from the workpiece.

30. The method of claim 5, wherein sensing a first thrust condition using the thrust sensing valve includes sensing a first thrust condition exerted upon the manufacturing tool.

31. The method of claim 5, wherein sensing a first thrust condition using the thrust sensing valve includes sensing a zero thrust condition.

32. The method of claim 5, wherein sensing a second thrust condition using the thrust sensing valve includes sensing a non-zero thrust condition.

33. The method of claim 5, wherein while advancing a drill member toward the workpiece includes while simultaneously rotating and advancing a drill member toward the workpiece.

34. The method of claim 5, wherein sensing a return from the second thrust condition at least partially to the first thrust condition includes sensing a breakthrough of the drill member through the workpiece.

35. The method of claim 5, wherein retracting the drill member includes simultaneously rotating and retracting the drill member.

* * * * *